United States Patent [19]
Schwengler et al.

[11] Patent Number: 5,923,303
[45] Date of Patent: Jul. 13, 1999

[54] COMBINED SPACE AND POLARIZATION DIVERSITY ANTENNAS

[75] Inventors: Thomas Schwengler, Lakewood; Patrick L. Perini, Broomfield, both of Colo.

[73] Assignee: U S West, Inc., Denver, Colo.

[21] Appl. No.: 08/998,393

[22] Filed: Dec. 24, 1997

[51] Int. Cl.$^6$ ..................... H01Q 21/00
[52] U.S. Cl. .............. 343/853; 343/797; 343/800
[58] Field of Search .................. 343/853, 797, 343/872, 798, 800, 810; H01Q 21/00

[56] References Cited

U.S. PATENT DOCUMENTS

| | | | |
|---|---|---|---|
| 4,833,482 | 5/1989 | Trinh et al. | 343/853 |
| 5,255,004 | 10/1993 | Berkowitz et al. | 343/853 |
| 5,546,096 | 8/1996 | Wada | 343/771 |

OTHER PUBLICATIONS

Publication entitled "Polarization Diversity in CDMA", by Francesco Sapienza, Martin Nilsson and Claes Beckman, Allgon System AB, Box 541, 183 25 Taby, Sweden.

Publication entitled "Polarization Diversity for Cellular Base Stations at 18000 Mhz", Master of Science Thesis, Ulrik Wahlberg, Jan. 14, 1997.

Publication entitled "Space vs. Polarization Diversity Gain in 2 GHz PCS 1900", Paul Donaldson, Robert Ferguson, Eric Kmiec and Robert Voss, MCI Telecommuications Corporation.

Publication entitled "Polarization Diversity in Mobile Communications", Rodney G. Vaughan, IEEE Transactions on Vehicular Technology, vol. 39, No. 3, Aug. 1990.

Book entitled Mobile Communications Design Fundamentals, $2^{nd}$ Ed., William C.Y. Lee, 1993, John Wiley & Sons. pp. 202–207.

Book entitled "The Mobile Radio Propagation Channel", J. D. Parsons, 1992, Pentech Press, pp. 142–145.

Book entitled "The Mobile Communications Handbook", Jerry D. Gibson, Edition–in–Chief, 1996, CRC Press, p. 174.

*Primary Examiner*—Hoanganh Le
*Attorney, Agent, or Firm*—Brooks & Kushman, P.C.

[57] ABSTRACT

An antenna system with both spatial and polarization diversity having a first antenna aperture and a second antenna aperture, a polarization separation angle formed by the difference between the polarization angle of the first antenna aperture and the polarization angle of the second antenna aperture, and a vertical separation formed by mounting the second antenna aperture a vertical distance above the first antenna aperture, such that diversity gain is achieved by both the polarization angle and the vertical distance. The combination of spatial and polarization diversity allows closer antenna aperture spacing and non-orthogonal polarization angles.

4 Claims, 2 Drawing Sheets

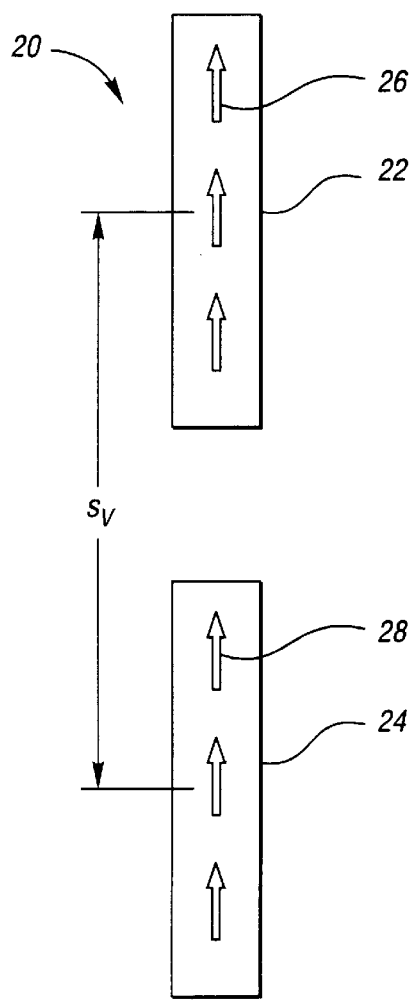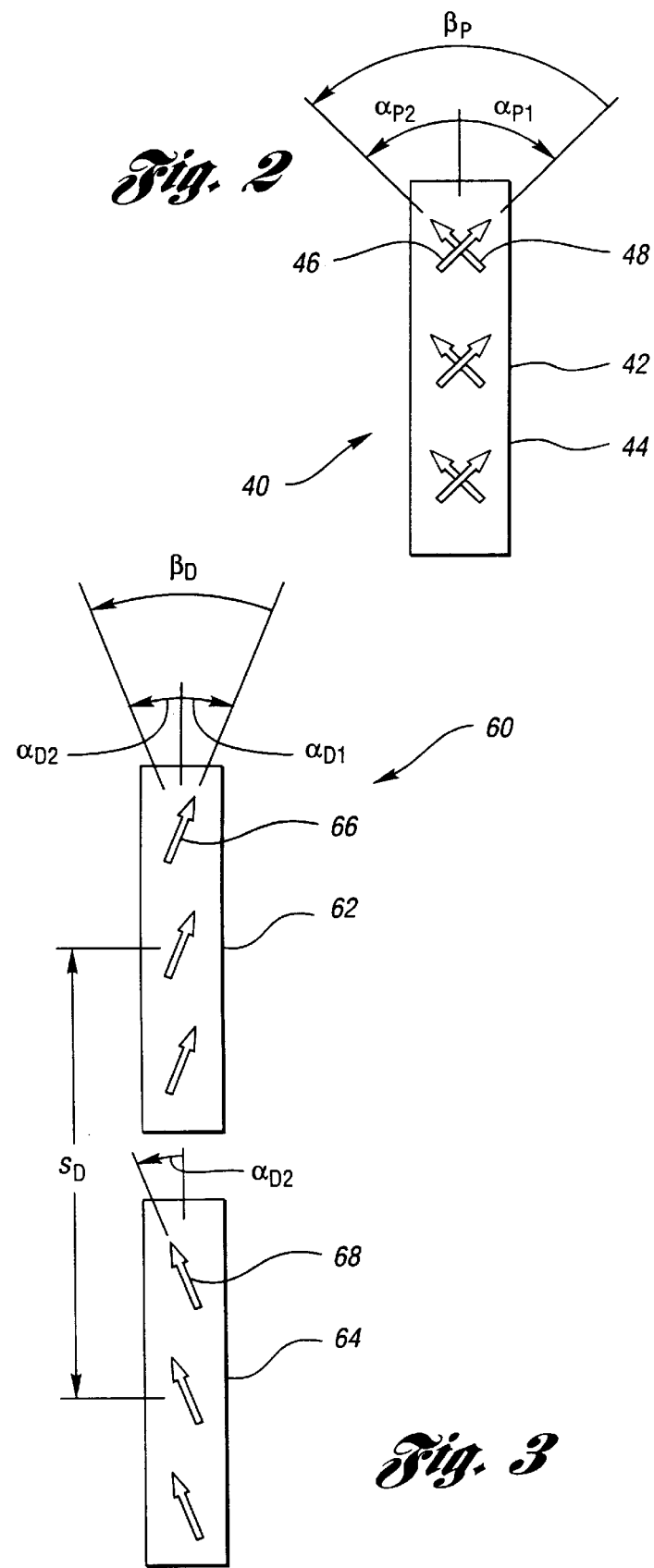

COMBINED SPACE AND POLARIZATION DIVERSITY ANTENNAS

TECHNICAL FIELD

The present invention relates to an antenna structure having apertures with both spacial diversity and polarization diversity.

BACKGROUND ART

Antenna diversity allows a station to reduce fast fading effects and therefore to improve reception by making use of multiple propagation paths. Diversity can be obtained by locating antennas in different spaces or by receiving signals of different polarization on two antennas located in the same general space.

Spatial diversity is usually achieved by placing one antenna away from another antenna horizontally or vertically. Horizontal diversity leads to good diversity gain, typically around 3 to 5 dB. To achieve horizontal spacial diversity, separation of several feet at PCS frequencies, such as 1.9 GHz, are required, leading to large antenna setup on a base station tower. A smaller setup can be achieved with vertical diversity. Unfortunately, in order to achieve sufficient decorrelation of signals, vertically spaced antennas must be placed further apart. This generally results in a stronger received signal from higher antennas, reducing diversity gain to typically less than 2 dB.

Polarization diversity consists of co-locating two antennas with different polarizations. The two polarization angles should be orthogonal to achieve sufficient decorrelation of the received signals. Possible configurations include horizontal/vertical (HV) polarization and slant ±45° polarization. HV polarization suffers from different propagation characteristics in the different polarization directions, with horizontal signals propagating worse than vertical. Slant ±45° polarization is better balanced but has the major drawback that, when also used to transmit, the antenna is not as efficient as a vertical polarization.

What is required are antennas that couple the benefits of both spacial and polarization diversity.

SUMMARY OF THE INVENTION

It is a primary object of the present invention to combine vertical spacial diversity with polarization diversity.

Another object of the present invention is to produce antennas that require less physical space.

Still another object of the present invention is to produce antennas for PCS that more easily meet zoning requirements.

A further object of the present invention is to produce antennas that costs less to manufacture and install.

In carrying out the above objects and other objects and features of the present invention, an apparatus implementing antennas with both spacial and polarization diversity is described. A first antenna with an aperture polarization angle is mounted to a support structure. A second antenna with a different aperture polarization angle is mounted to the support structure a vertical distance above the first antenna. The angular distance between the first aperture polarization angle and the second aperture polarization angle and the vertical distance separating the antennas combine to provide diversity gain between the first antenna and the second antenna.

In an embodiment of the present invention, the polarization angle of the first antenna aperture is 30° from vertical in one rotational direction and the aperture angle of the second antenna is 30° from vertical in the other rotational direction.

In another embodiment of the present invention, the first and second antenna apertures are each comprised of a plurality of vertically spaced elements.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram of vertical spatial diversity;

FIG. 2 is a schematic diagram of polarization diversity;

FIG. 3 is a schematic diagram of polarization and spacial diversity according to the present invention.

BEST MODES FOR CARRYING OUT THE INVENTION

Figure 4:
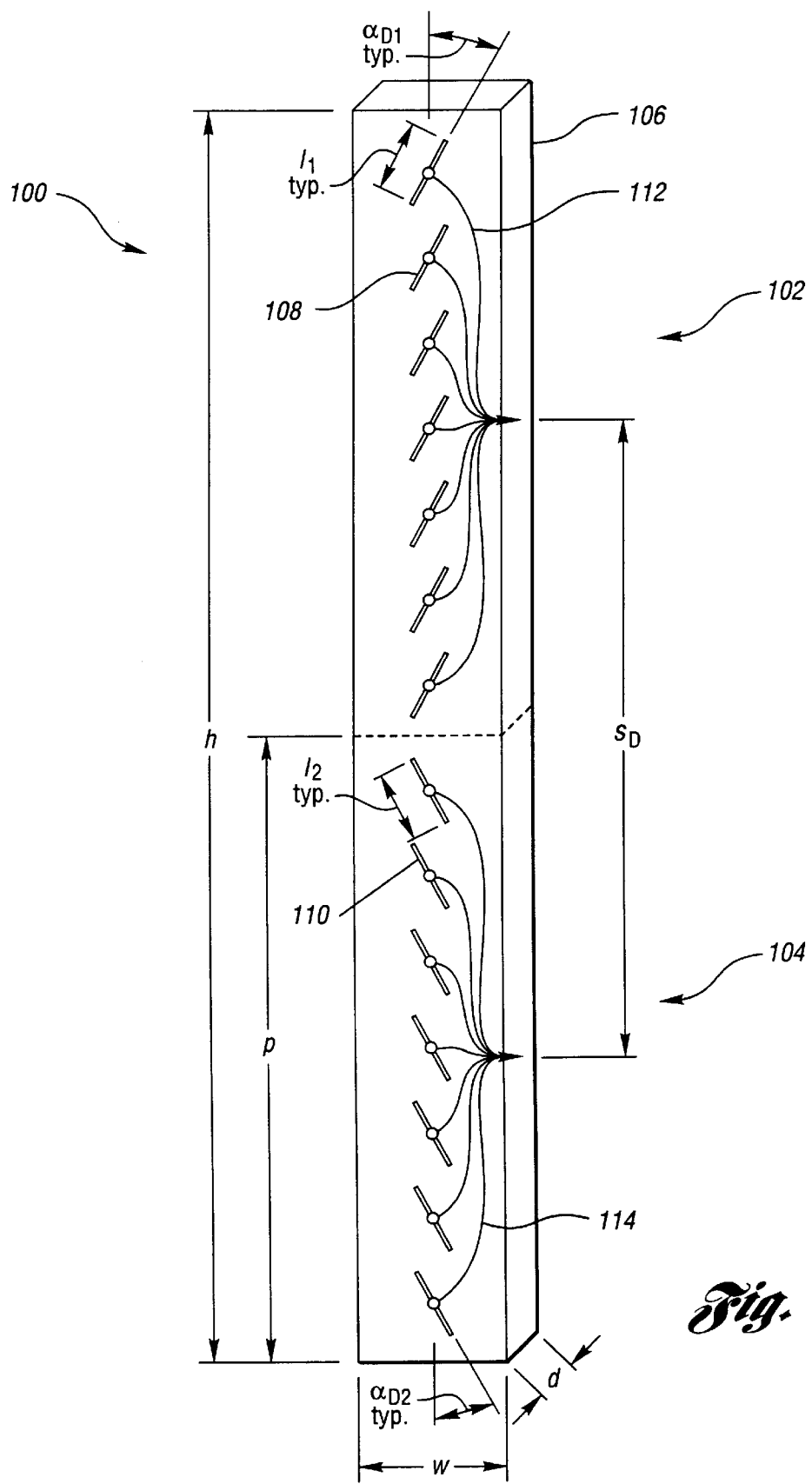
FIG. 4 is a drawing of a dual antennas structure according to the present invention.

Referring now to FIGS. 1 through 3, schematic diagrams of antenna diversity techniques are shown. In each figure, rectangles represent antenna apertures and arrows represent polarization directions. Two design parameters are of primary interest, aperture separation distance s and polarization separation angle $\beta$. The aperture separation distance is the linear distance between the centers of two apertures. The polarization separation angle is the angular distance between the polarization angles for two apertures. The aperture polarization angle is the angle between vertical and the pointing direction of the E field.

Referring now to FIG. 1, a schematic diagram of vertical spacial diversity is shown. A spatially diversified structure shown generally by 20 includes top vertical aperture 22 and bottom vertical aperture 24. Diversity between transmitted signals is obtained by a vertical separation distance, $s_V$. The polarization angle of the top aperture is shown as 26. The polarization angle of the bottom aperture is shown as 28. The polarization separation angle, defined as the angle between the top and bottom polarization angles, is zero.

Referring now to FIG. 2, a schematic diagram of polarization diversity is shown. A polarly diversified structure, shown generally by 40, has a first aperture 42 co-located with a second aperture 44. The polarization angle of first aperture 42, $\alpha_{P1}$, is shown generally as 46. The polarization angle of second aperture 44, $\alpha_{P2}$, is shown generally as 48. The polarization separation angle $\beta_P$ is the difference between $\alpha_{P1}$ and $\alpha_{P2}$. Decorrelation between the two received signals is achieved by making $\beta_P$ equal ±90°. Therefore, signals received by aperture 42 and 44 are orthogonal and, hence, are decorrelated, and the reception of two decorrelated signals achieves diversity.

Referring now to FIG. 3, a schematic diagram of spacial and polarization diversity according to the present invention is shown. A spatially and polarly diversified structure, shown generally as 60, has a top aperture 62 and a bottom aperture 64 vertically spaced by separation distance $s_D$. The polarization angle of top aperture 62, $\alpha_{D1}$ is shown as 66. The polarization angle of bottom aperture 64, $\alpha_{D2}$, is shown as 68. The polarization separation angle $\beta_D$ is the difference between $\alpha_{D1}$ and $\alpha_{D2}$. Diversity is achieved by both separation distance $s_D$ and polarization separation angle $\beta_D$.

By using both vertical spatial and polarization diversity, many advantages over spatial diversity alone are realized.

First, good decorrelation of the two signals can be achieved with a reduced distance separating the two antenna apertures, hence better balance in received signal is obtained, resulting in better diversity performance. In addition, a better balance between the two transmitted signals is achieved for cases where one channel is used on each antenna aperture. Second, a smaller structure results. The structure may fit into one physical radome, making it cheaper and simpler to install. Also, reduced size makes compliance with zoning ordinances easier. Third, better isolation between the two signals results because the two apertures have different polarizations.

By using both vertical spatial and polarization diversity, many advantages over only polarization diversity are realized. First, since the magnitude of both $\alpha_{D1}$ and $\alpha_{D2}$ can be smaller than 45°, more signal is vertically polarized, resulting in better propagation of the transmitted signal. Second, received signals are better isolated due to the spatial separation. Third, the resulting structure may be narrower since dual pole antennas are generally built with two series of adjacent patches.

An additional advantage is that the spatial and polarization diversity structure has two design parameters, allowing more flexibility to determine an optimal setup.

Referring now to FIG. 4, a drawing of an illustrative embodiment of a dual antenna structure according to the present invention is shown. A dual antenna structure, shown generally as 100, has a top aperture, shown generally as 102, and a bottom aperture, shown generally as 104. Both apertures 102 and 104 are contained in housing 106.

In the illustrative embodiment, top aperture 102 is comprised of seven elements, one of which is indicated by 108. Each top element 108 has a length $l_1$ of approximately 3 inches and is vertically spaced from adjacent top elements by 3 to 6 inches, with 6 inch spacing shown in FIG. 4. Each top element 108 has a polarization angle $\alpha_{D1}$ of 30° clockwise as viewed. Each top element 108 is connected via the top feed network 112 to a first communication system not shown.

Likewise, bottom aperture 104 is comprised of seven elements, one of which is indicated by 110. Each bottom element 110 has a length $l_2$ of approximately 3 inches and is vertically spaced from adjacent bottom elements by 3 to 6 inches, with 6 inch spacing shown in FIG. 4. Each bottom element 110 has a polarization angle $\alpha_{D2}$ of −30° clockwise as viewed. Bottom elements 110 and top elements 108 lie along the same vertical line within housing 106. Each bottom element 110 is connected via the bottom feed network 114 to a second communication system not shown.

Housing 106 has height h of 8 feet, width w of 6 to 8 inches, and depth d of 3 inches. The height of bottom aperture p is 4 feet. The vertical diversity distance $s_D$ is 4 feet.

Housing 106 may be constructed from a non-conductive material such as an engineering plastic. Top elements 108 and bottom elements 110 may be constructed from aluminum or copper strips. Top feed network 112 and bottom feed network 114 may be implemented using coaxial cable, microstrip circuits, or a similar hollow waveguide.

It will be understood by one of ordinary skill in the art that FIG. 4 is illustrative, and that different dimensions, numbers of elements, element configurations, polarization angles, and material may be used based on many factors including carrier frequencies, power, and desire to limit size and cost, within the scope and spirit of the present invention.

While the best modes for carrying out the invention has been described in detail, those familiar with the art to which this invention relates will recognize various alternative designs and embodiments for practicing the invention as defined by the following claims.

What is claimed is:

1. A multiple antenna system for supporting personal communication systems, wherein the antenna system has both spatial and polarization diversity, the antenna system comprising:

a housing with a vertical axis;

a first antenna comprising a plurality of first elements disposed within the housing, wherein each first element has a center aligned with the vertical axis and wherein each first element has a first aperture polarization angle;

a first feed system connecting each of the plurality of first elements with a first communication system;

a second antenna comprising a plurality of second elements disposed within the housing, wherein each second element has a center aligned with the vertical axis and wherein each second element has a second aperture polarization angle; and a second feed system connecting each of the plurality of second elements with a second communication system.

2. The multiple antenna system of claim 1 wherein the angular distance between the first polarization angle and the second polarization angle is less than 90 degrees.

3. The multiple antenna system of claim 1 wherein the first polarization angle and the second polarization angle are equal in magnitude but opposite in sign.

4. The multiple antenna system of claim 3 wherein the first polarization angle is 30 degrees in one rotational direction and the second polarization angle is 30 degrees in the opposite rotational direction.

* * * * *